United States Patent [19]

Mori

[11] Patent Number: 4,924,728

[45] Date of Patent: May 15, 1990

[54] GEAR SHIFT MECHANISM WITH A DAMPER DEVICE

[75] Inventor: Masanori Mori, Chiryu, Japan

[73] Assignee: Aisin Seiki Kabushiki Kaisha, Aichi, Japan

[21] Appl. No.: 325,318

[22] Filed: Mar. 17, 1989

[30] Foreign Application Priority Data

Mar. 17, 1988 [JP] Japan .................. 63-064068

[51] Int. Cl.⁵ .............................................. F16H 35/12
[52] U.S. Cl. .................................... 74/640; 192/106.2
[58] Field of Search ................ 74/687, 752 C, 665 G, 74/665 P, 640, 730, 731; 192/106.2; 464/68

[56] References Cited

U.S. PATENT DOCUMENTS

| | | | |
|---|---|---|---|
| 2,745,268 | 5/1956 | Reed | 192/106.2 X |
| 4,441,594 | 4/1984 | Kubo et al. | 192/106.2 X |
| 4,614,261 | 9/1986 | Takeuchi | 192/106.2 |
| 4,690,660 | 9/1987 | Hashimoto | 464/68 |
| 4,792,030 | 12/1988 | Huber et al. | 192/106.2 |

FOREIGN PATENT DOCUMENTS 2017875 10/1979 United Kingdom ............. 192/106.2
2158194 11/1985 United Kingdom ................. 464/68

*Primary Examiner*—Dwight G. Diehl
*Attorney, Agent, or Firm*—Sughrue, Mion, Zinn, Macpeak & Seas

[57] ABSTRACT

A gear shift device for motor vehicles in which a fluid pressure production unit is arranged between a gear shift mechanism and a damper device and is connected directly with a drive input member. In the damper device for the gear shift device, the gear shift mechanism is connected through a first output member to the drive input member. The fluid pressure production unit is simultaneously connected to the input member through a second output member. Therefore, the torsional rigidity of the damper device can be set small enough to restrain the neutral noise associated with gear shift devices.

2 Claims, 4 Drawing Sheets

GEAR SHIFT MECHANISM WITH A DAMPER DEVICE

BACKGROUND OF THE INVENTION

This invention relates to a gear shift mechanism which uses fluid pressure to carry out a gear shift operation and a damper device for the gear shift mechanism.

A gear shift mechanism, as an example, is disclosed in Japanese Patent Application No. 62-110061. The gear shift mechanism is so arranged that a torsional damper device, a gear shift mechanism and an oil pump are disposed around a main shaft. The torsional damper device is connected with the crank shaft of an engine and an end of a main shaft. The oil pump is located at the other end of the main shaft. When the main shaft rotates, fluid pressure is produced and supplied to the gear shift mechanism through an internal orifice of the main shaft. The gear shift mechanism is arranged between the torsional damper device and the oil pump to change the rotation rate of the main shaft.

Thus, in such a conventional gear shift device the gear shift mechanism and the oil pump are both connected with the torsional damper device through the same main shaft. However, in the prior gear shift device, there still exists a so-called "neutral noise" caused by the shift mechanism during the operation of the shift mechanism. This "neutral noise" is produced when a very small change of torque is delivered to the gear shift mechanism at a time when the device is not subject to a driving torque. In other words, the "neutral noise" comes from the striking of the gear teeth of the gear shift mechanism.

Therefore, if the torsional rigidity of the torsional damper device is kept low enough to absorb the slight change of torque delivered to the gear shift mechanism, the "neutral noise" can be prevented.

However, in the prior gear shift mechanism, even though the gear shift mechanism is in a neutral state, since the torque necessary for driving the oil pump acts on the torsional damper device, it is difficult to have a very low torsional rigidity for the torsional damper device.

SUMMARY OF THE INVENTION

A first object of the present invention is the provision of a gear shift device for motor vehicles comprising an input part driven by an engine; a fluid pressure production unit which produces fluid pressure; a gear shift mechanism operated by the fluid pressure produced by the fluid pressure production unit; and a damper device connected with the gear shift mechanism and the input part. The fluid pressure production unit is set in the space between the gear shift mechanism and the damper device and is connected directly with the input part.

A second object of the present invention is the provision of a damper device comprising an input part driven by an engine; a first output part connected with the gear shift mechanism; and a resilient member which connects the input part to the first output part and is deformed according to the value of the torque delivered from the input part to the output part; a second output part is provided between the input part and the fluid pressure production unit to connect them with each other.

The fluid pressure production unit is arranged in the space between the gear shift mechanism and the damper device and connected directly with the input part, hence only the torque delivered to the gear shift mechanism acts on the damper device. On the other hand, the torque necessary for driving the fluid pressure production unit does not act on the damper device at all. As a result, in a state of nearly no torque acting on the gear shift mechanism, the torque which acts on the damper device tends to zero. Therefore, the torsional rigidity of the damper device can be designed small enough to restrain the "neutral noise".

The gear shift mechanism via the first output part is connected to the input part. Simultaneously the fluid pressure production unit via the second output part is connected to the input part. In this case only torque delivered to the gear shift mechanism acts on the resilient member. The torque needed for driving the fluid pressure production unit does not act on the resilient member. As a result, in a state of almost no torsional action on the gear shift mechanism, the torque on the damper device nearly becomes zero. Therefore the rigidity of the resilient member is designed to be very low and the "neutral noise" can be restrained.

BRIEF DESCRIPTION OF THE DRAWINGS

In the drawings which illustrate the best mode presently contemplated for carrying out the present invention.

DETAILED DESCRIPTION OF A PREFERRED EMBODIMENT

Figure 1:
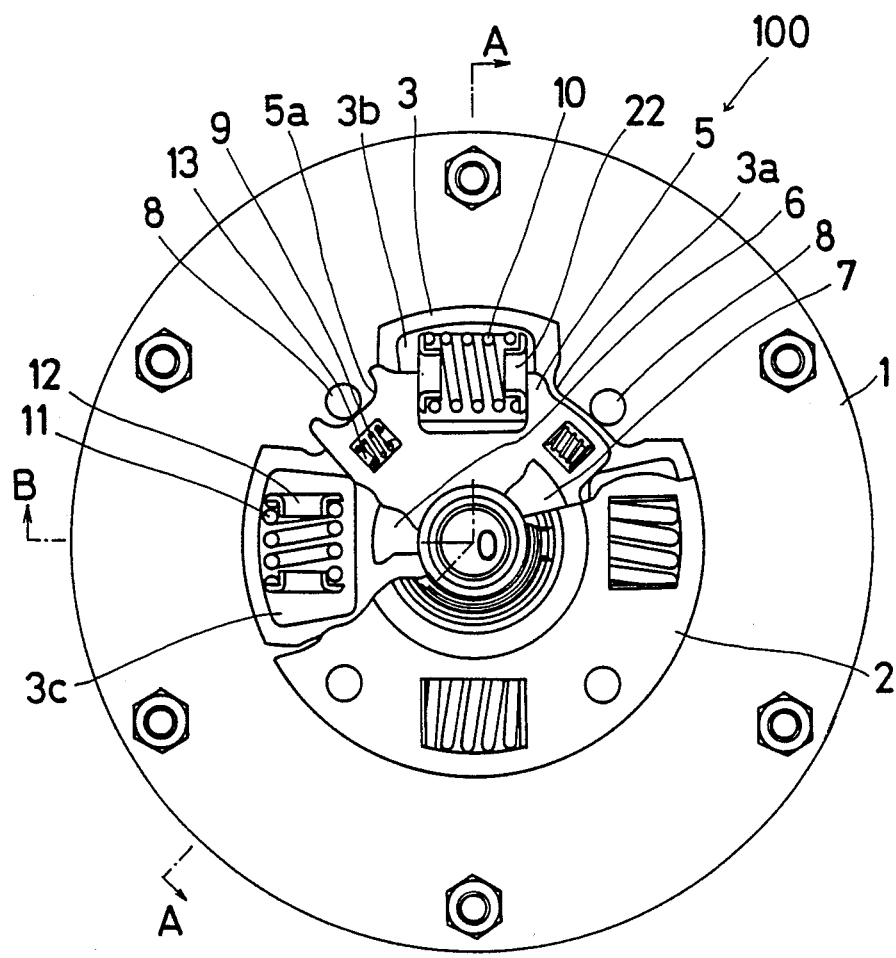
FIG. 1 is an end elevational view, partly broken away, of a preferred embodiment of a damper device of the present invention.
Figure 2:
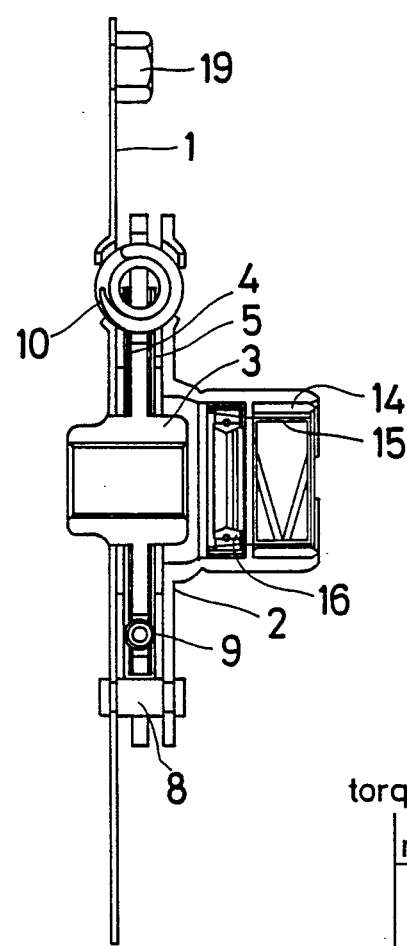
FIG. 2 is a sectional view taken along the line of FIG. 1.
Figure 3:
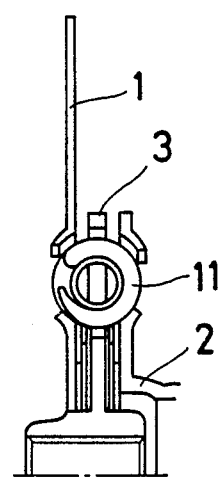
FIG. 3 is a cross sectional view taken along the line of FIG. 1.
Figure 6:
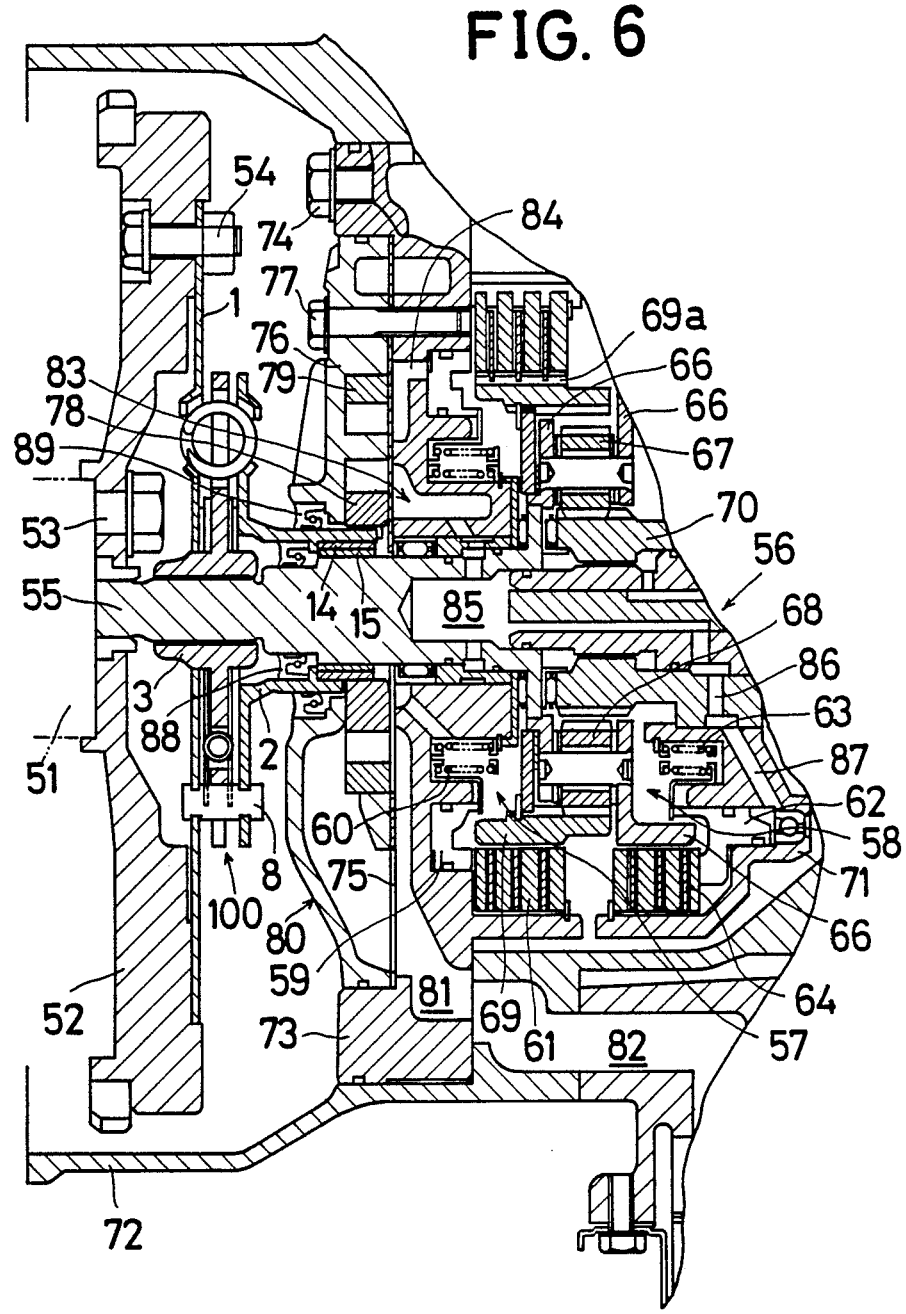
FIG. 6 is a cross sectional view of the main parts of the preferred embodiment of the gear shift device of the present invention.

A disc 1 of the torsional damper device is connected with the crank shaft 51 of an engine by bolts 54 and nuts 19 as shown in FIGS. 1 and 6 to rotate with the crank shaft simultaneously. A drive plate 2 is secured to the disc 1 by stopper pins 8. A certain gap between the disc 1 and the drive plate 2 is set by means of the stopper pins 8. The drive plate 2 is formed with a cylindrical hub in which an oil seal 88 is located.

A driven plate 3 is inserted into the space between the disc 1 and the drive plate 2. A plate 4 is inserted between the disc 1 and driven plate 3, a plate 5 is inserted between the drive plate 2 and the driven plate 3, a lining plate 7 is disposed between the drive plate 2 and the plate 5 and a lining plate 6 is inserted between the driven plate 3 and the plate 5 as well.

In this kind of mechanism, the disc 1 with the drive plate 2 rotate simultaneously. The hub 3 between the disc 1 and the drive plate 2, the plate 4 and the plate 5 rotate independently.

The stopper pins 8 are secured on the disc 1 and on the hub 3 there is a concave recess 3a which can engage the stopper pin 8. As a result, the amount of relative rotation of the disc 1 and the drive plate 2 is limited to a set angle.

In addition, the concave recesses 4a and 5a on the plates 4 and 5 can also engage with the stopper pin 8 (only recess 5a is shown in the drawing), so that the relative rotation between the disc 1, the plate 4 and the plate 5 is limited to a set angle.

A compression spring 9 supported by washers 22 is fixed on the plate 5. The spring 10 is inserted in a recess 3b in the plate 3. A gap produced between the spring 10 and the recess 3b is relative to the size of the recesses 4a and 5a. A spring 11 supported by washers 12 is mounted on the disc 1. The spring 11 is inserted into a recess 3c in the plate 3. A gap produced between the spring 11 and the recess 3c is relative to the size of the recess 3a.

In this sort of mechanism, the disc 1 is connected with the plate 3 by the springs 9, 10 and 11 when torque is transmitted between the disc 1 and the driven plate 3 with the springs 9, 10 and 11 being compressed respectively in that order. As a result, the characteristics shown in FIG. 4 are obtained.

Figure 4:
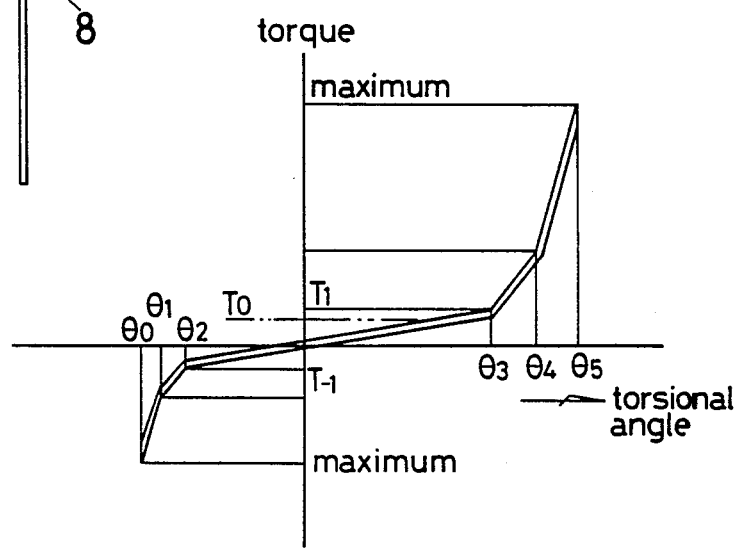
FIG. 4 is a graphical representation of the torsional characteristic the damper device.

FIG. 4 illustrates the torsional characteristics of the embodiment of the torsional damper device 100. In the interval of torsional angle $\Theta_0 - \Theta_1$, and in the interval of torsional angle $\Theta_4 - \Theta_5$, the springs 10 and 11 are compressed. In the interval of torsional angle $\Theta_1 - \Theta_2$ and $\Theta_3 - \Theta_4$, the spring 9 is compressed. In addition, due to the linings 6 and 7, a hysteresis characteristic can be obtained between the torsional angle $\Theta$ and torque T.

As mentioned above, in the torsional damper device 100, the disc 1 rotates together with the drive plate 2. The disc 1 and the hub 3 rotate relatively and their rotation characteristics are illustrated in FIG. 4.

Figure 5:
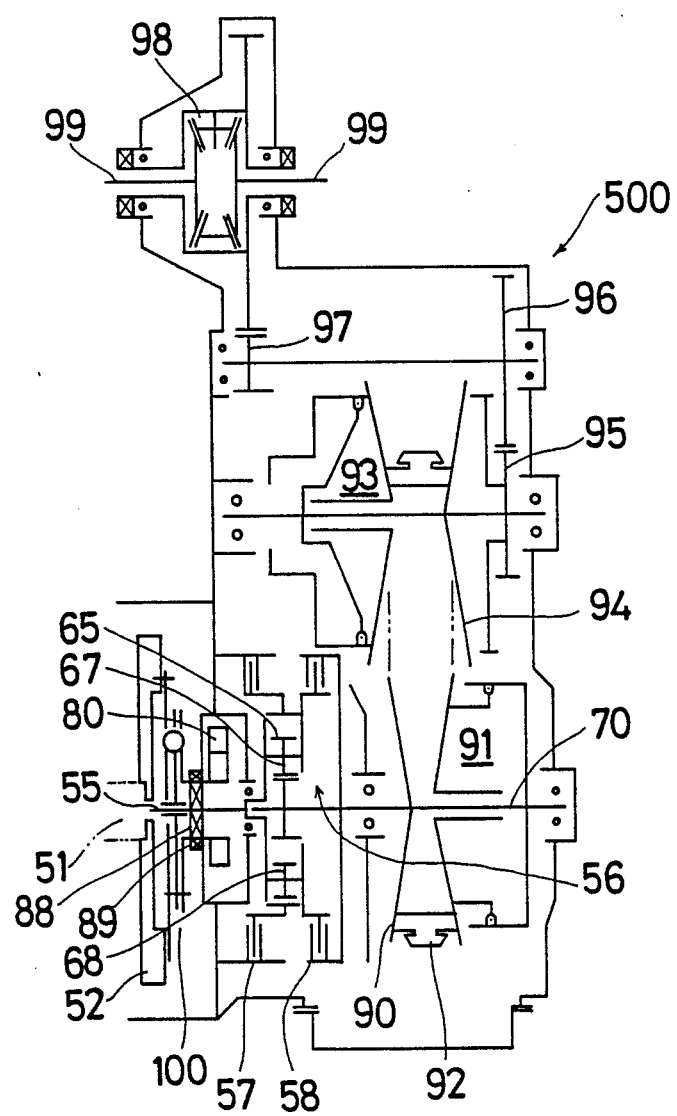
FIG. 5 is a schematic drawing of a preferred embodiment of the gear shift of the present invention.

Referring to FIGS. 5 and 6, the gear shift device 500 which includes the torsional damper device 100 mentioned above is described as follows.

A schematic diagram of the gear shift device 500 is depicted in FIG. 5 and a cross sectional drawing of the main parts of the gear shift device 500 is shown in FIG. 6. A sleeve 73 is secured in housing 72 with bolts 74. An oil pump body 76 is secured on the sleeve 73 with bolts 77 with a steel sheet 75 secured therebetween. A drive gear 78 and a driven gear 79 are fitted in the oil pump body 76 whereby they can rotate freely. The hub of the drive plate 2 is connected with the drive gear 78 and a sleeve 14 and a bush 15 are fitted between the hub of the drive plate 2 and an input shaft 55. The drive plate 2 and the input shaft 55 are kept in alignment by the sleeve 14 and bush 15. In addition, an oil seal 88 is disposed between the hub of the drive plate 2 and the input shaft 55. An oil seal 89 is arranged between the hub of the drive plate 2 and the oil pump body 76.

A fly wheel 52 is secured on a crank shaft 51 by a bolt 53 in order to rotate simultaneously therewith. Torsional damper device 100 is connected with the fly wheel 52 by bolts 54 so that the disc 1 and the fly wheel 52 rotate together. The input shaft 55 is connected in the hub 3. The input shaft 55 is also connected with a forward and reverse mechanism 56 which consists of a brake 57, a clutch 58 and an epicyclic gear unit 65. A hydraulic brake unit 61 is operated by a brake piston 59 and a return spring 60 of the brake 57. The brake piston 59 is set in the shaft sleeve 73.

A clutch unit 64 is operated by a clutch piston 62 and a return spring 63 through the clutch 58. The epicyclic gear unit 65 consists of a carrier 66, planetary gears 67 and 68 and a ring gear 69. The carrier 66 and the input shaft 55 are connected together and rotate simultaneously. Planetary gears 67 and 68 are fitted on the carrier 66 and rotate freely thereon. The ring gear 69 surrounds the carrier 66 and grooves 69a are formed on the external surface of the ring gear 69. The discs of the brake unit 61 engage with the grooves 69a. Grooves are also formed on the external surface of carrier 66 (no diagram is shown) in order to engage with discs of the clutch unit 64.

The planetary gear 67 meshes with a sun gear 70 which is fixed on a drum 71. The piston 62 is fitted in the drum 71. The high pressure oil from the oil pump flows via tubes 81 and 82 into a regulating valve. The oil, of which the pressure is regulated, then goes to a tube 83 or 84. The high pressure oil from the tube 84 moves the brake piston 59 so that the ring gear 69 is engaged by the brake 57. At that time, the sun gear 70 rotates in the opposite direction to the input shaft. When the high pressure oil is delivered to the tube 83, it flows to tubes 85, 86 and 87 to move the clutch piston 62 and engage the carrier 66 with the clutch 58. At that time, sun gear 70 rotates in the same direction as the input shaft.

The sun gear 70 drives a first fixed pulley 90 and a first movable pulley 91. The first fixed pulley 90 and the first movable pulley 91 drive a second movable pulley 93 and a second fixed pulley 94 through a belt 92. The first movable pulley 91 and the second movably pulley 93 are connected with the regulating valve by suitable means (not shown). The desired increase and decrease in the gear ratio of the first movable pulley 91 and the second movable pulley 93 can be obtained by means of controlling the operating oil pressure for these pulleys.

The second movable pulley 93 and the second fixed pulley 94, through gear trains 95, 96 and 97, drive a differential gear 98 and then drive a pair of driven shafts 99 simultaneously.

As mentioned above, the disc 1 drives the hub 3 through compression springs 9, 10 and 11 and the hub 3 is connected to the input shaft 55 for rotation. At the same time, the disc 1 through the stopper pins 8, drives the drive plate 2 which makes the oil pump 80 rotate. Therefore, the rotation of the disc 1 makes the input shaft 55 and the oil pump 80 rotate respectively. As a result, the minimum torque acting on the compression springs 9, 10 and 11 almost tends to be zero. Hence the setting of the low torsional rigidity interval $\Theta_2 - \Theta_3$ of the torsional damper device 100 is in a wide range. As a result, the "neutral noise" can be effectively prevented.

Moreover, according to the device of the present invention, the crank shaft 51 is connected with the forward and reverse transfer mechanism 56 through the compression springs 9, 10 and 11 of the torsional damper device 100. Due to the operating of the brake 57 or the clutch 58, the initial impact produced by the forward and reverse transfer mechanism 56 can be absorbed by the torsional damper device 100 so that the forward and reverse transfer is carried out smoothly.

In addition, any slight torsional variation produced from the crank shaft 51 can be absorbed by the torsional damper device 100 which possesses a wide interval $\Theta_2 - \Theta_3$ of low torsional rigidity and therefore the "neutral noise" of the forward and reverse transfer mechanism 56, gear trains 95, 16, 97 and 98 and the differential gears 99 etc. can be restrained.

In this embodiment, because of the arrangement of the oil pump 80 between the torsional damper device 100 and the forward and reverse transfer mechanism 56, the oil path between the main shaft 55 and the sun gear 70 is relatively short.

While the invention has been particularly shown and described with reference to preferred embodiments thereof, it will be understood by those in the art that the foregoing and other changes in form and details may be made therein without departing from the spirit and scope of the invention.

What is claimed is:

1. A gear shift device for motor vehicles comprising an input member adapted to be driven by an engine;
   a fluid pressure production means for producing fluid pressure;
   a gear shift mechanism operable by the fluid pressure produced by the fluid pressure production means; and
   a damper means connected with the gear shift mechanism and the input member, said fluid pressure production means being disposed between the gear shift mechanism and the damper means and connected directly with the input member.

2. A gear shift device as set forth in claim 1, wherein said damper means comprises resilient means connecting said input member and a first output member and being deformable relatively according to the value of the torque delivered from said input member to said first output part and connecting said input member to a second output member connected to said fluid pressure production means.

* * * * *